United States Patent [19]
Schutz

[11] Patent Number: 5,622,279
[45] Date of Patent: Apr. 22, 1997

[54] PALLET CONTAINER FOR TRANSPORTATION AND STORAGE OF LIQUIDS

[76] Inventor: Udo Schutz, Bahnhofstrasse 25, D-56242 Selters, Germany

[21] Appl. No.: 527,844

[22] Filed: Sep. 13, 1995

[30] Foreign Application Priority Data

Sep. 14, 1994 [DE] Germany .............................. 9414911 U

[51] Int. Cl.⁶ .................................................. B61D 21/02
[52] U.S. Cl. ........................... 220/571; 220/401; 220/403; 220/601; 220/DIG. 6
[58] Field of Search ............................ 220/DIG. 6, 410, 220/601, 670, 809, 403, 571, 401

[56] References Cited

U.S. PATENT DOCUMENTS

| | | | |
|---|---|---|---|
| 2,354,425 | 7/1944 | Kuhn | 220/601 |
| 3,964,636 | 6/1976 | Rehrig | 220/DIG. 6 |
| 3,972,450 | 8/1976 | Walters | 220/DIG. 6 |
| 4,243,197 | 1/1981 | Wright | 220/DIG. 6 |
| 5,161,690 | 11/1992 | Foshaug | 220/DIG. 6 |
| 5,259,509 | 11/1993 | Boal, Jr. et al. | 220/DIG. 6 |
| 5,465,865 | 11/1995 | Coombes | 220/601 |

FOREIGN PATENT DOCUMENTS 4206945  3/1993  Germany .

*Primary Examiner*—Joseph M. Moy
*Attorney, Agent, or Firm*—Young & Thompson

[57] ABSTRACT

Pallet container (1) which can be used as a disposable or reusable container for the transport and storage of liquids has as main components interchangeable plastic container (2), which is equipped with filler neck (3) which can be closed with screw top (4) and discharge connecting piece (5) with drain fitting (6) and drain bottom (7), outer jacket (8) which is made as a lattice jacket, pallet (11) designed as flat bottom tray (12) made of sheet-metal for holding inner container (2) by form-fit, as well as upper frame (13) for stiffening of outer jacket (8) and for the protection of inner container (2). Drain area (14) of bottom tray (12) under drain cock (6) is covered by molded part (20) of plastic which is resistant to corrosive liquids and which protects the sheet metal material of bottom pan (12) against corrosion by liquid dripping down during discharge from inner container (2) and by liquid dripping out of leaky drain cock (6) in the transport and storage of corrosive liquids with or in pallet container (1).

5 Claims, 3 Drawing Sheets

PALLET CONTAINER FOR TRANSPORTATION AND STORAGE OF LIQUIDS

FIELD OF THE INVENTION

The invention relates to pallet containers for transport and storage of liquids, with an inside container of plastic or sheet metal with sealable fill opening and a drain and flushing opening for connection of a drain fitting, which has a drain bottom and an outer jacket designed as a lattice or sheet metal jacket and which stands in a flat bottom tray of sheet metal designed as a pallet.

BACKGROUND OF THE INVENTION

The need to save raw materials as well as transport and storage costs and legal environmental regulations force the pertinent industry to fill with liquids large-volume containers of the generic type which are offered on the market and which can be reused according to DE 42 06 945 C1 instead of as in the past barrels with significantly smaller capacity, for transport and for storage.

The generic pallet container has the disadvantage that the drain area of the bottom tray produced from steel sheet, under the drain fitting of the plastic inner container during transport of corrosive liquids, corrodes due to the action of liquid which drips down during removal and of liquid which drips out from the inner container through a leaky drain fitting.

SUMMARY OF THE INVENTION

The object of the invention is to develop effective protection against corrosive liquids for the drain area of the bottom tray of the generic pallet container.

This object is achieved according to the invention by a pallet container with the features of the claim 1.

The pallet container according to the invention is characterized by attainment of the set object in a simple and appropriate manner.

BRIEF DESCRIPTION OF THE DRAWINGS

The new pallet container is explained below based on the drawings. Here.

DETAILED DESCRIPTION OF THE INVENTION

Figure 1:
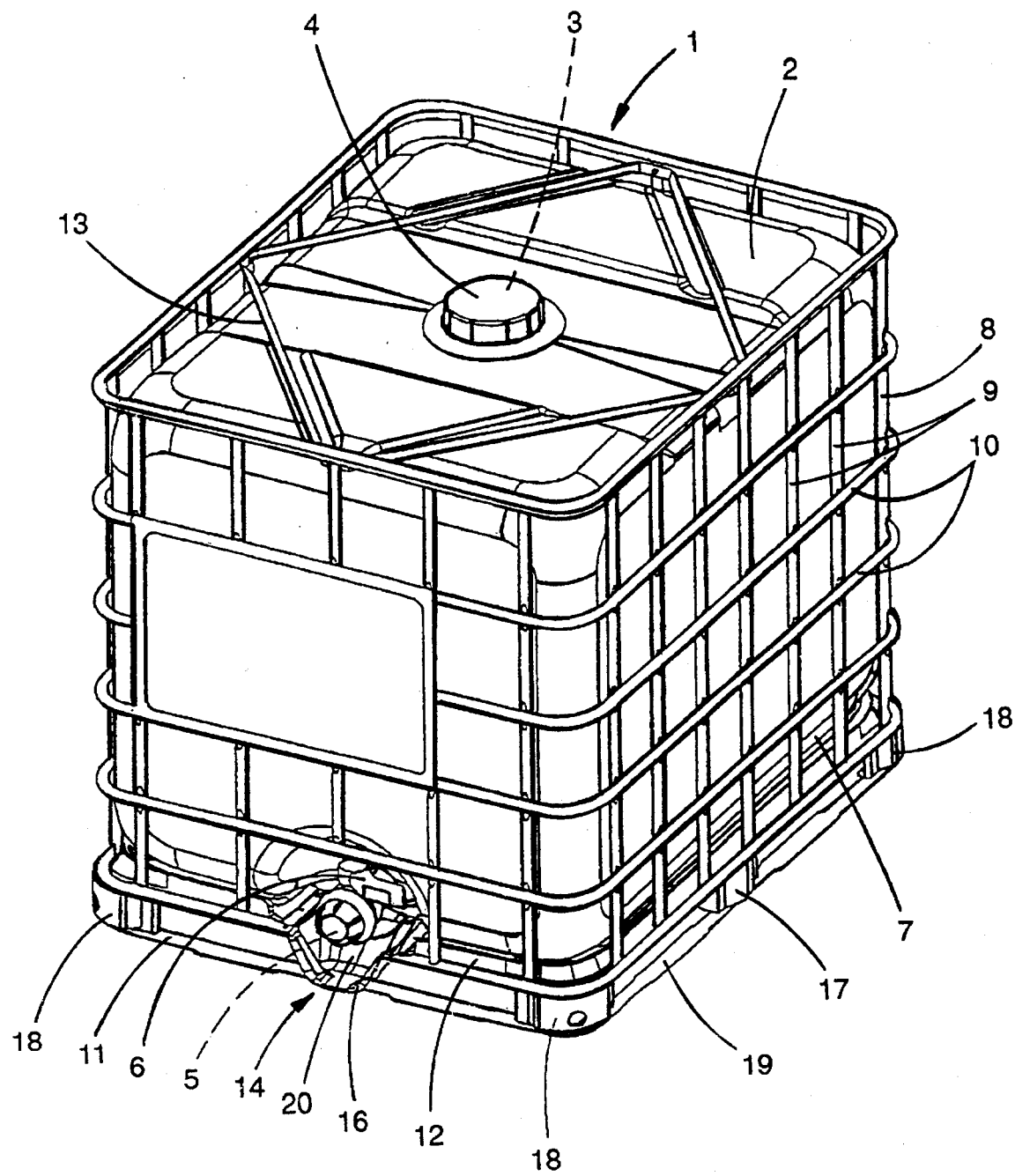
FIG. 1 shows a perspective view of the pallet container.
Figure 2:
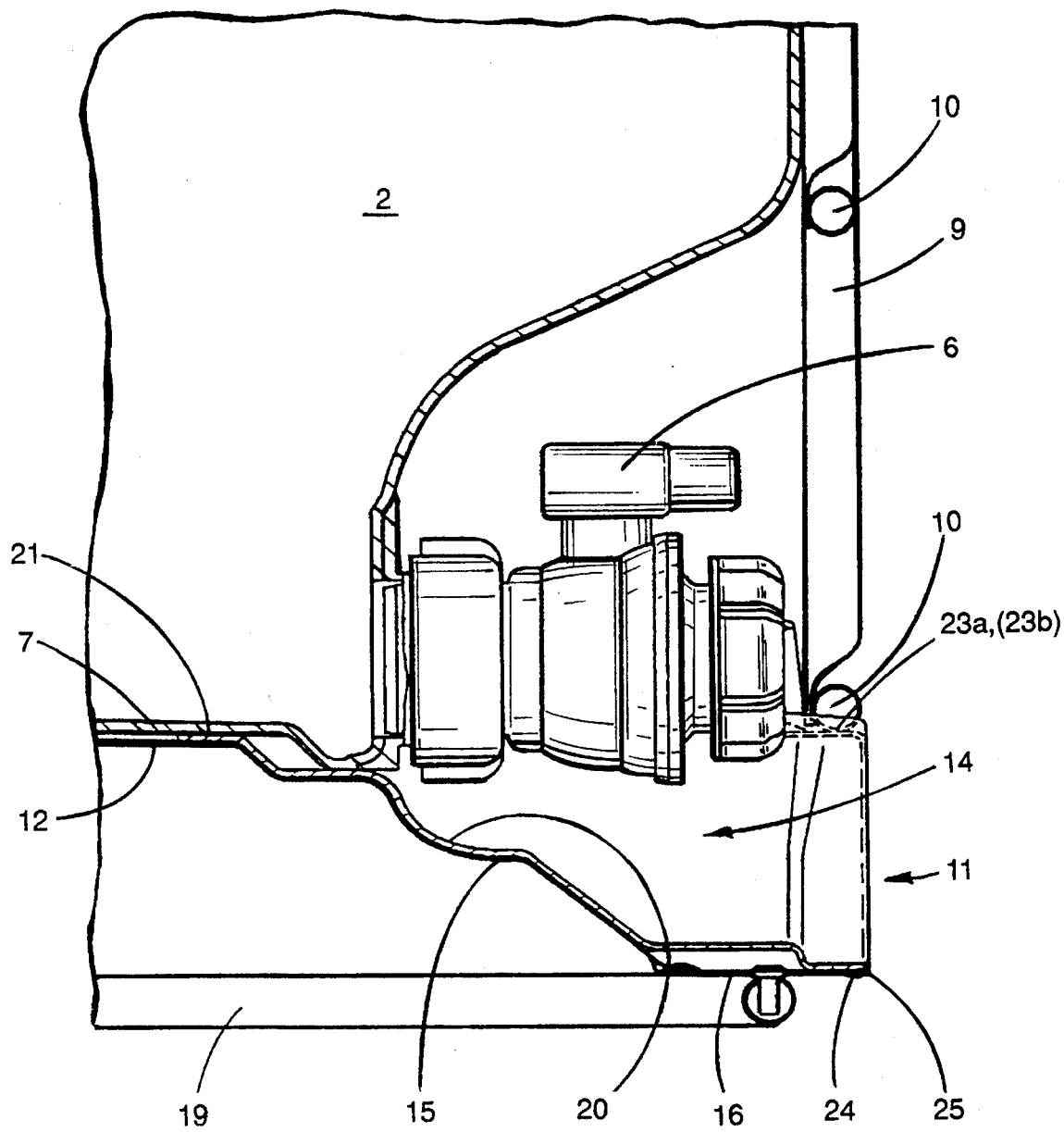
FIG. 2 shows a section through the drain area of the container according to line II—II of FIG. 1 in an enlarged view and, FIG. 3 shows an enlarged overhead view of the drain area of the bottom tray of the container.
Figure 3:
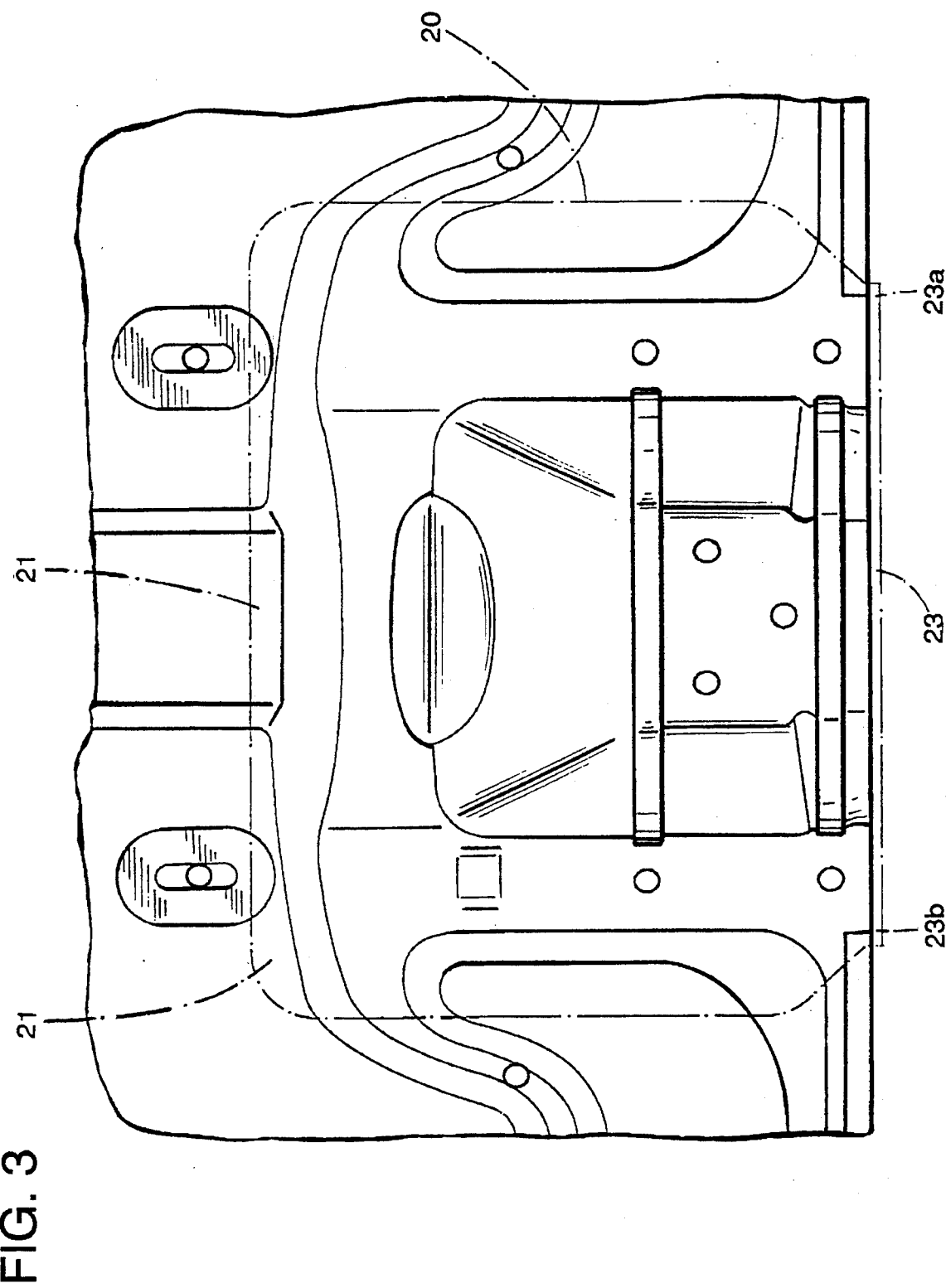

Pallet container 1 which can be used as a disposable or reusable container according to FIG. 1 for the transport and the storage of liquids has as the main components interchangeable, parallelepiped-shaped inner container 2 of polyethylene with rounded corners, which is equipped with filler neck 3 which can be closed with screw top 4, and discharge connecting piece 5 with drain fitting 6 and drain bottom 7, outer jacket 8 which is made of crossing vertical and horizontal metal lattice bars 9, 10, pallet 11 designed as flat bottom tray 12 made of sheet-metal with European standard length and width dimensions for accommodating plastic inner container 2 by form-fit, as well as upper frame 13 of diagonally arranged pipe braces for stiffening of lattice jacket 8 and for the protection of inner container 2.

Trough-shaped depression 15 which is open to the front and which forms center foot 16 with a U-shaped cross sectional profile with which bottom tray 12 together with other three center feet 17 and four corner feet 18 stands on pallet frame 19 is molded into drain area 14 of bottom tray 12 under drain fitting 6 of inner container 2.

Drain area 14 of bottom tray 12 is covered by molded part 20 of plastic which is resistant to corrosive liquids and which protects the sheet metal material of bottom tray 12 against corrosion by liquid dripping down during discharge from inner container 2 and by liquid dripping out of leaky drain cock 6 in the transport and storage of corrosive liquids with or in pallet container 1.

Molded part 20 is pinched with its rear inner edge area 21 between inner container 2 and bottom tray 12 and is screwed to bottom tray 12 with sections 23a, 23b of its outer edge 23 which lie on outside edge 22 of bottom tray 12 together with lattice jacket 8.

The outer edge 23 of molded part 20 has drip edge 25 which projects down over outer edge 24 of depression 15 of drain area 14 of bottom tray 12.

I claim:

1. In a pallet container for transporting and storing liquids, comprising: an inner container made of one of plastic and sheet metal and having a sealable fill opening, a drain opening for connection to a drain fitting, a drain bottom, and an outer jacket designed as a lattice, said container standing in a pallet designed as a flat bottom tray made of sheet metal, the improvement wherein the bottom tray has in a drain area located under the drain fitting of the inner container a trough-shaped depression which opens outwardly, and which forms a center foot having a U-shaped cross-sectional profile, said bottom tray standing on the pallet via said center foot, other center feet, and corner feet, and said drain area being covered by a molded part which is resistant to corrosive liquids.

2. Pallet container according to claim 1, wherein the molded part is made of plastic material.

3. Pallet container according to claim 1, wherein the molded part has a rear inner edge which is pinched between the inner container and the bottom tray.

4. Pallet container according to claim 1, wherein the molded part has an outer edge, and sections of said outer edge which lie on an outside edge of the bottom tray are screwed to the bottom tray together with the outer jacket.

5. Pallet container according to claim 4, wherein the outer edge of the molded part has a drip edge which projects down over an outer edge of the trough-shaped depression.

* * * * *